T. W. BARRY.
LOGGING WHEEL.
APPLICATION FILED JUNE 11, 1915.
1,207,701.
Patented Dec. 12, 1916.
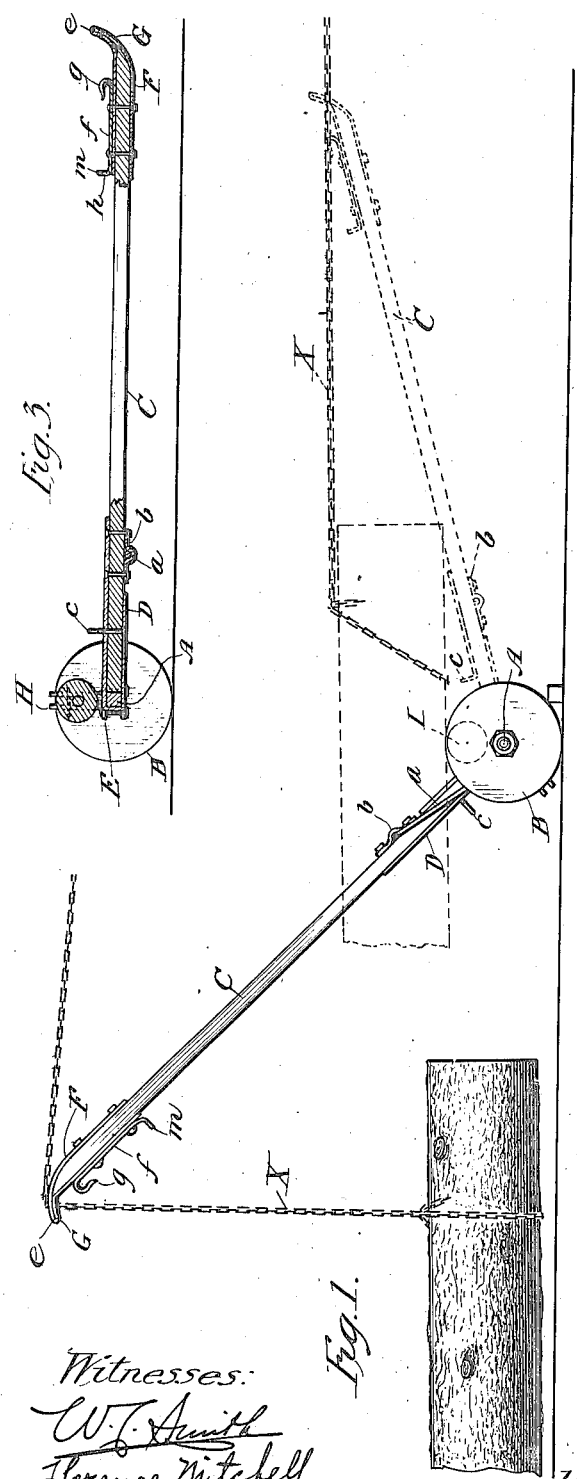
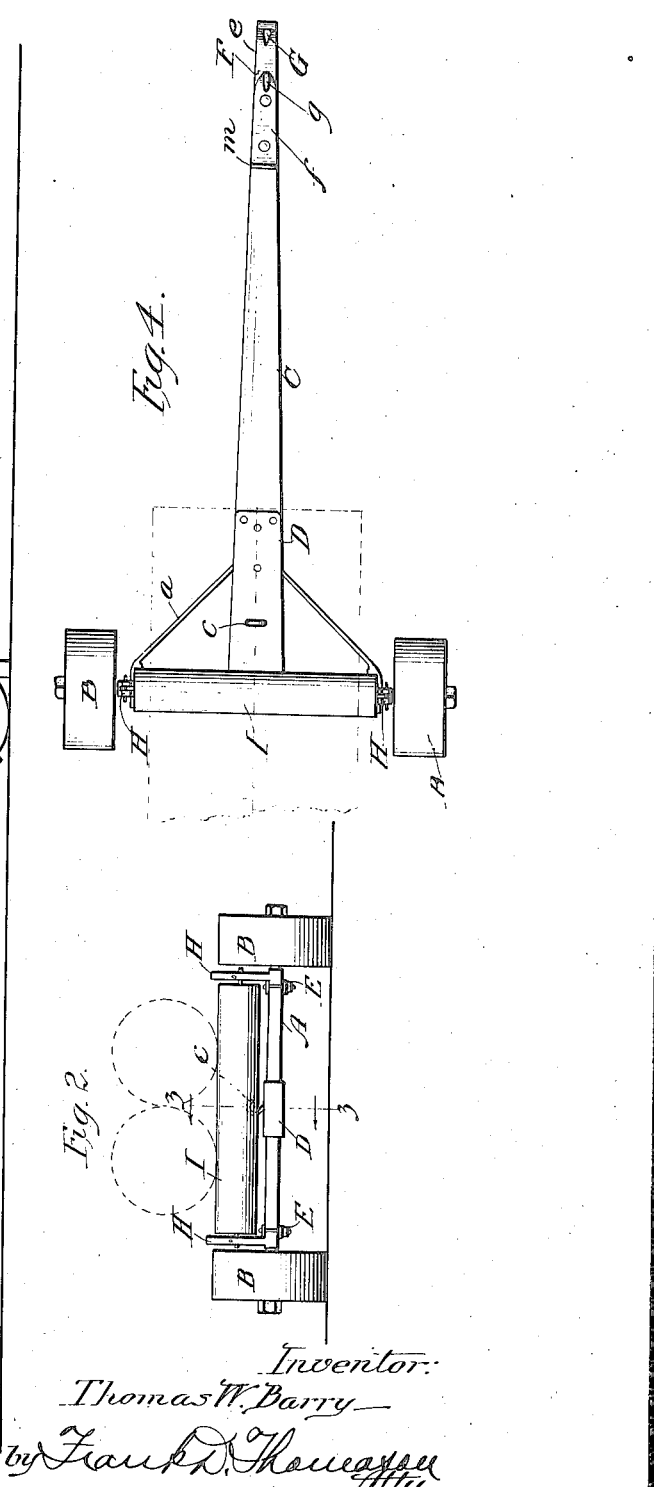

UNITED STATES PATENT OFFICE.

THOMAS W. BARRY, OF KEWEENAW, MICHIGAN.

LOGGING-WHEEL.

1,207,701.  Specification of Letters Patent.  Patented Dec. 12, 1916.

Application filed June 11, 1915. Serial No. 33,430.

*To all whom it may concern:*

Be it known that I, THOMAS W. BARRY, a citizen of the United States, residing at Keweenaw, in the county of Baraga and State of Michigan, have invented new and useful Improvements in Logging-Wheels, of which the following is a full, clear, and exact description.

My invention relates to the vehicle used by lumbermen to carry and drag trees and logs from where they are cut down to places where they are sawed into proper lengths, or piled up, or loaded on cars, as the case may be. Heretofore, a pair of wheels, ten to twelve feet in diameter, have been used, and the trunk of the tree or the log suspended from the heavy axle thereof. The size of these wheels caused them to meet with more obstacles and made it more difficult to make headway through the forests and dense woodland growth, and the end of the log carried thereby came in contact with undergrowths, tree-stumps, stones and the irregularities of the surface of the ground and made the conveying of them very difficult.

The object of my invention is to overcome these difficulties and to make it comparatively simple and easy work to lift and carry trees and logs from place to place. This I accomplish by the means hereinafter fully described, and as particularly pointed out in the claims.

In the drawings: Figure 1 is a side view of my invention showing the manner of operating the same in dotted lines. Fig. 2 is a rear end view of the same. Fig. 3 is a longitudinal central section taken on dotted line 3—3, Fig. 2. Fig. 4 is a plan view thereof.

Referring to the drawings, A represents a strong axle which is, preferably, made of metal, and has heavy wide tired wheels B, B, mounted on the arms thereof. Midway between these wheels the axle has a tongue C secured to and projecting forward therefrom, the length of which is approximately about four or five times the diameter of the wheels, which latter are about two and one-half feet in diameter. The tongue is quite broad at its rear end and gradually gets narrower as it extends forward, and the means employed to connect it to the axle must be strong and should reinforce the same. The means illustrated in the drawings for this purpose comprise a clip D consisting of a U-shaped strip of metal the bend of which is passed around the center of length of the axle, the longer arm of which laps over and extends forward upon the upper surface of the rear portion of the tongue, and the shorter arm of which laps against and extends forward in contact with the under surface of the tongue. A bolt passes through both of these arms, the upper extended end of which terminates in a transversely disposed hook $c$, and the portion of the upper arm extending forward beyond the lower arm is secured by rivets the lower ends of which pass through the tongue and are headed and secure a strap $b$ to the same, which strap has a transverse knuckle in which the central portion of a V-shaped brace $a$ is seated. The corresponding legs of this brace $a$ extend rearwardly and outwardly and have their extremities flattened and bent to the rear over the axle to which they are firmly secured by common clips E, E, which latter comprise the usual U-shaped bolt and nuts. The forward end of the tongue is sandwiched between the upper and lower plates of a metal shoe F, which at their forward ends merge into an upwardly curved horn or runner that extends beyond the forward end of the tongue. This runner, beyond the tongue, is provided with an eye or opening G therein the forward contours of which are rounded or substantially semi-circular, and the rear half of the contours of which describe a longitudinal slot the sides of which converge toward each other and meet at their rear ends, as shown. The rear portion of the upper plate of shoe F has a longitudinally disposed plate $f$ mounted thereon and secured thereto by rivets that assist in securing the shoe to the tongue. The forward end of this plate is formed into and terminates in a hook $g$ the point of which extends upward and to the rear, and the rear end $m$ thereof is bent upward and has an eye $h$ therein.

The axle A, preferably, at points between the clips E, E, and the arms on the ends of the axle, has posts H, H, arising therefrom to a point slightly beyond the circumference of the wheels, and the upper half, say, of these posts, are slotted transversely to provide open bearings for the journals of a transverse roller I, the diameter of which is such that the uppermost point or segment of its periphery is about the same distance from the axis of the axle as the periphery of the wheels.

The construction of the parts of my invention is substantially as hereinbefore described, but it will be understood that so long as the principal features thereof are retained the dimensions of the same and the details of construction thereof may be changed without departing from the spirit of my invention.

The operation of my invention is substantially as follows: The wheels are first blocked, as shown in Fig. 1 of the drawings, and then the tongue is moved into the rearwardly inclined position, shown in Fig. 1 of the drawings. A chain X is then threaded through eye G in the curved portion of the shoe F, and its pendent end is secured around the end of the log or the front of the tree which it is desired to carry. One or more horses are then attached to the forward end of chain X and driven ahead, thus lifting the log and moving it forward into the position shown in dotted lines in Fig. 1 and until the tree trunk or log rests upon roller I, substantially as shown in dotted lines. The chain is then caught upon hook g, the blocks removed from in front of the wheels and the horse or horses driven ahead to move the log or tree to its destination. If it is desired to carry more than one log or tree, the forward ends of the trunks or logs are tied together by a chain or cable (not shown) which can be caught on the transversely disposed hook c, and in order to distribute the pulling power equally on both trees or logs the chain or cable is first passed through eye h of plate f and is then caught by hook g.

The slotted eye G is a very important feature of the curved horn or runner e of the tongue as it permits the chain to be drawn forward therethrough, but prevents the rearward movement thereof in view of the links moving into the rear slotted portion of the openings and being held thereby. The upwardly curved runner is also a very important feature in view of the fact that the draft animals are not harnessed to the tongue, and without this curvature the end of the tongue would dig into and catch against obstacles instead of sliding over them.

What I claim as new is:

1. A vehicle of the kind described comprising a pair of wheels, an axle on the arms of which said wheel are moutned, a tongue suitably secured to and projecting forward from said axle, a shoe mounted upon the forward end of said tongue having an eye forming a holding means in the forwardly extending end thereof, a roller which is journaled in bearings secured to and arising from said axle, and means threaded through said eye to the rear end of which the load to be lifted is attached.

2. A vehicle of the kind described comprising a pair of wheels, an axle on the arms of which said wheels are mounted, a tongue suitably secured to and projecting from said axle, a shoe mounted upon the front end of said tongue the forward end of which extends beyond the forward end of said tongue is curved upwardly and has an eye therein, and means threaded through said eye and adapted to be held thereby to the rear end of which the load to be lifted is attached.

3. A vehicle of the kind described comprising a pair of wheels, an axle on the arms of which said wheels are mounted, a tongue suitably secured to and projecting forward from said axle, a shoe mounted on the forward end of said tongue and having its forward extended end curved upward and provided with an eye the rear portion of which is extended longitudinally and has the sides thereof converse to and meet at the rear end of the same, and a chain threaded through said eye and held thereby to whose rear end the load to be lifted is attached.

4. A vehicle of the kind described comprising a pair of wheels, an axle on the arms of which said wheels are mounted, a tongue suitably secured to and projecting forward from said axle, a shoe on the forward end of the tongue the forward extended end of which is curved upward and has a suitable eye therein, a roller which is journaled in open bearings secured to and arising from said axle, and a chain threaded through said opening to the rear end of which the load to be lifted is attached.

5. A vehicle of the kind described comprising a pair of wheels, an axle on the arms of which said wheels are mounted, a tongue suitably secured to and projecting forward from said axle, a shoe on the forward end of the tongue the forward extended end of which is curved upward and has a suitable eye therein, a hook the point of which extends to the rear and which is secured to and projects from the rear end of said shoe, a roller which is journaled in open bearings secured to and arising from said axle, and a chain threaded through said opening to the rear end of which the load to be lifted is attached.

In witness whereof I have hereunto set my hand and seal this 26th day of May, 1915.

THOMAS W. BARRY.

Witnesses:
J. EDW. CLEMENTS,
F. W. ICKES.